(12) United States Patent
Hardt et al.

(10) Patent No.: US 7,072,186 B2
(45) Date of Patent: Jul. 4, 2006

(54) COMPUTER CHASSIS

(75) Inventors: Thomas T. Hardt, Missouri City, TX (US); Carlos Torres, Houston, TX (US); Kurt A. Manweiler, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/721,806

(22) Filed: Nov. 25, 2003

(65) Prior Publication Data

US 2005/0111200 A1    May 26, 2005

(51) Int. Cl.
*G05K 7/16* (2006.01)
(52) U.S. Cl. ...................... 361/727; 361/752
(58) Field of Classification Search ........ 361/683–688, 361/724–733, 736, 752, 760; 312/223.1, 312/223.2, 333
See application file for complete search history.

(56) References Cited

U.S. PATENT DOCUMENTS

| | | | |
|---|---|---|---|
| 4,918,572 A * | 4/1990 | Tarver et al. ............... 361/736 |
| 5,406,453 A | 4/1995 | Cusato et al. | |
| 6,046,912 A * | 4/2000 | Leman ....................... 361/784 |
| 6,208,522 B1 | 3/2001 | Manweiler et al. | |
| 6,392,142 B1 | 5/2002 | Uzuka et al. | |
| 6,411,506 B1 | 6/2002 | Hipp et al. | |
| 6,459,589 B1 * | 10/2002 | Manweiler et al. ......... 361/752 |
| 6,469,899 B1 | 10/2002 | Hastings et al. | |
| 6,594,150 B1 * | 7/2003 | Creason et al. ............. 361/727 |
| 6,785,133 B1 * | 8/2004 | Barringer et al. ........... 361/694 |
| 2003/0206398 A1 * | 11/2003 | Stamos et al. .............. 361/686 |

* cited by examiner

*Primary Examiner*—Lynn Feild
*Assistant Examiner*—Anthony Q. Edwards

(57) ABSTRACT

A computer chassis comprising a chassis base and first and second drawers removably engaged with the chassis base. An interface board is mounted to the first drawer so as to couple to a first electrical component when the first electrical component is located in the first drawer. The second drawer has a connector mounted so as to couple to a second electrical component when the second electrical component is located in the second drawer. The connector engages the interface board so as to couple the first electrical component to the second electrical component when the first and second electrical components are located in the respective first and second drawers.

29 Claims, 4 Drawing Sheets

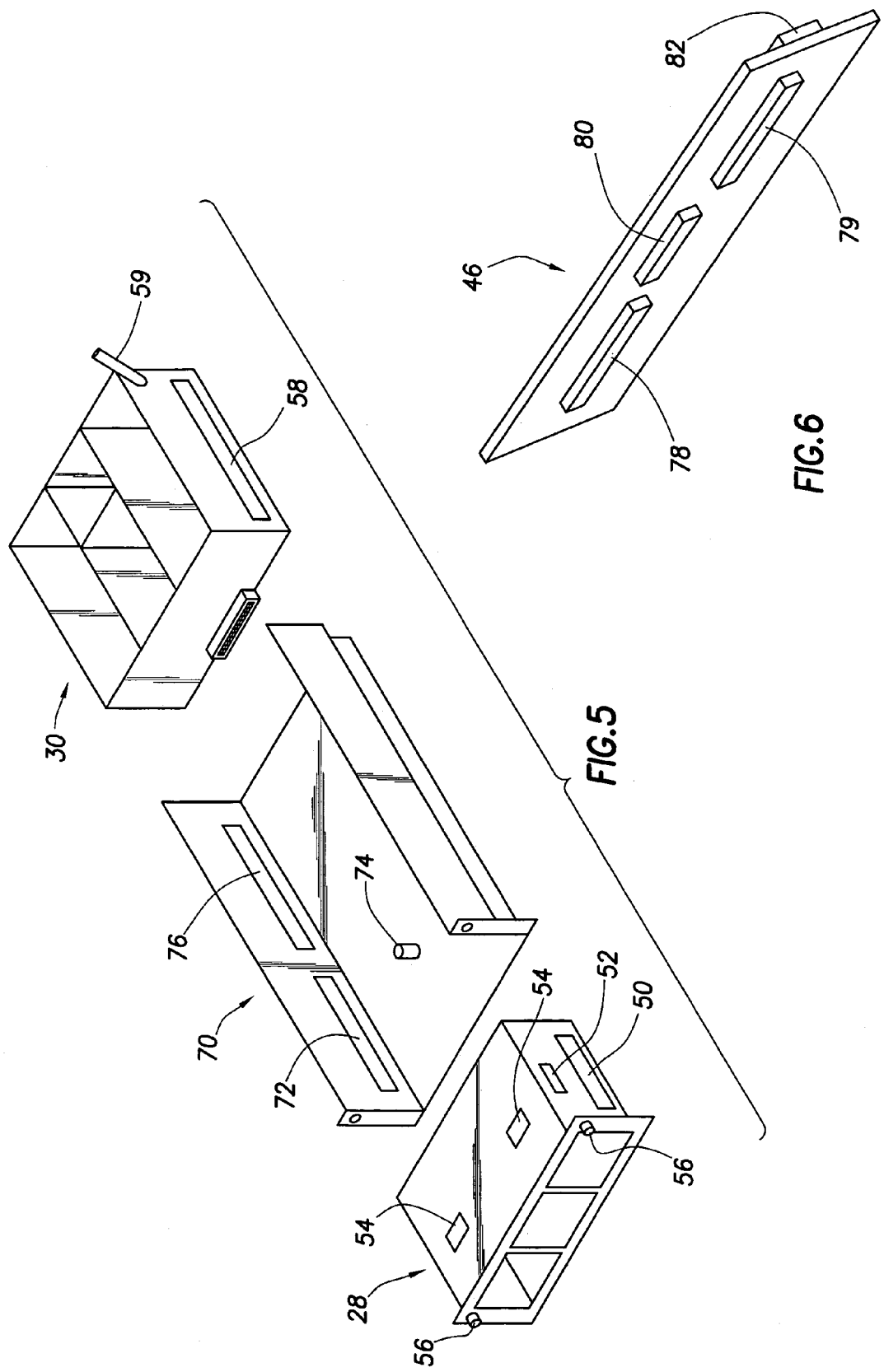

COMPUTER CHASSIS

BACKGROUND

In the development of computer systems, the increased use of modular components has allowed for increased efficiency in adding and removing components to and from the system. This increased efficiency has contributed to an added emphasis on the simplification of assembly, maintenance, and upgradability. Computer system chassis are designed to provide mounting locations for the operating components of the computer system. Once the size and configuration of a chassis is established it is often difficult to effectuate changes to the design and layout of the chassis.

The limitations of a particular chassis configuration are often most evident when an upgrade to the computer system is desired and, although a selected component may be able to interface with the computer system, the chassis potentially limits the upgrades available. This most often results in the development and construction of a new chassis to accommodate the desired upgrade. Therefore, as can be appreciated, there is a need for a computer chassis that is easily adaptable for use with a variety of modular components.

SUMMARY

The problems noted above are solved in large part by an adaptable computer chassis. One of the exemplary embodiments may comprise a chassis base and first and second drawers removably engaged with the chassis base. An interface board is mounted to the first drawer so as to couple to a first electrical component when the first electrical component is located in the first drawer. The second drawer has a connector mounted so as to couple to a second electrical component when the second electrical component is located in the second drawer. The connector engages the interface board so as to couple the first electrical component to the second electrical component when the first and second electrical components are located in the respective first and second drawers.

BRIEF DESCRIPTION OF THE DRAWINGS

For a detailed description of exemplary embodiments of the invention, reference will now be made to the accompanying drawings in which:

FIG. 5 illustrates a top perspective view of the assembly of the computer chassis in accordance with embodiments of the invention; and FIG. 6 illustrates an isometric view of a midplane board in accordance with embodiments of the invention.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
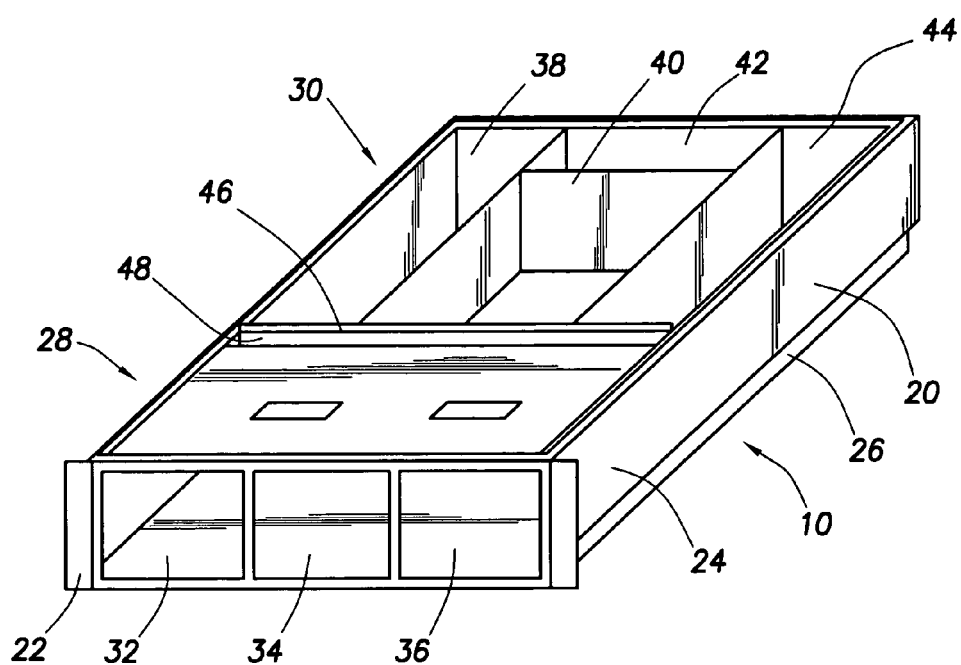
FIG. 1 illustrates a front perspective view of a computer chassis in accordance with embodiments of the invention.

Referring now to FIG. 1, a computer chassis 10 is configured as a rack mounted server chassis. Chassis 10 comprises chassis base 20 having front 22 and sides 24 comprising rack rail interfaces 26. Chassis base 20 is configured to accept a front drawer 28 and a rear drawer 30, which are inserted laterally into the base, and are configured to hold various modular computer components. Chassis base 20 may also include a top (not shown) that can be moveably or detachably connected to the base and, when installed, covers the tops of front drawer 28 and rear drawer 30.

In the embodiments shown, front drawer 28 comprises a power supply bay 32, hard drive bay 34, and media module bay 36. The modular components mounted in front drawer 28 couple to a mid-plane board 46 mounted at the rear 48 of the front drawer. Rear drawer 30 comprises expansion card bay 38, processor bay 40, cooling system bay 42, and memory bay 44. The modular components mounted in rear drawer 30 couple to a motherboard (not shown) installed in the bottom of the rear drawer. The motherboard comprises a connector that interfaces with the mid-plane board 46 to couple the components of front drawer 28 and rear drawer 30.

Figure 2:
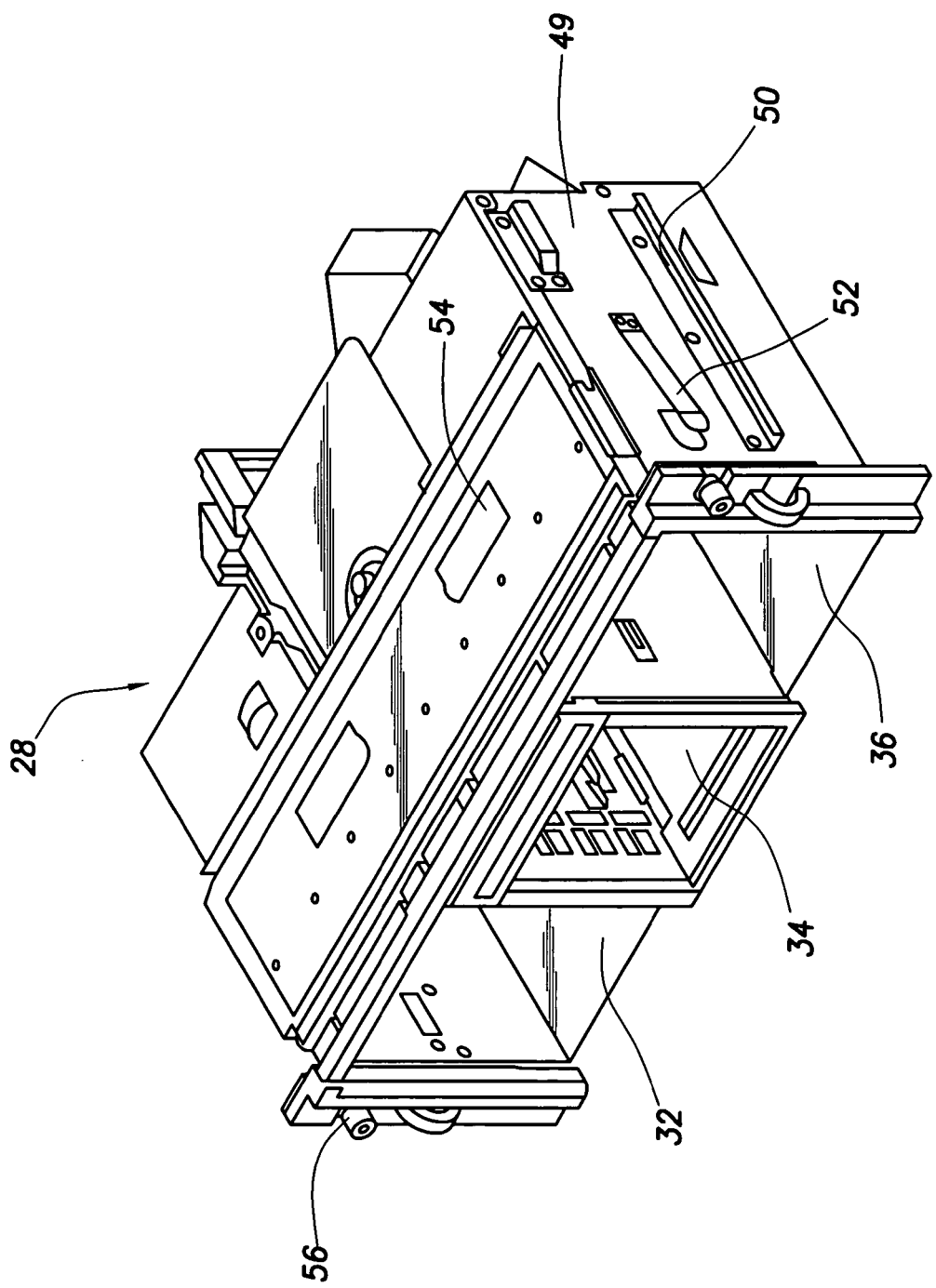
FIG. 2 illustrates a front perspective view of a front drawer in accordance with embodiments of the invention.

Referring now to FIG. 2, embodiments of a front drawer 28 are shown comprising power supply bay 32, hard drive bay 34, and media module bay 36. Both sides 49 of front drawer 28 also include rails 50, springs 52, latches 54, and thumbscrews 56. These components act to locate and secure the drawer within chassis base 20. Rails 50 are configured to interface with chassis base 20 and control the vertical position of the front drawer. Springs 52, latches 54, and thumbscrews 56 secure front drawer 28 to chassis base 20.

Figure 3:
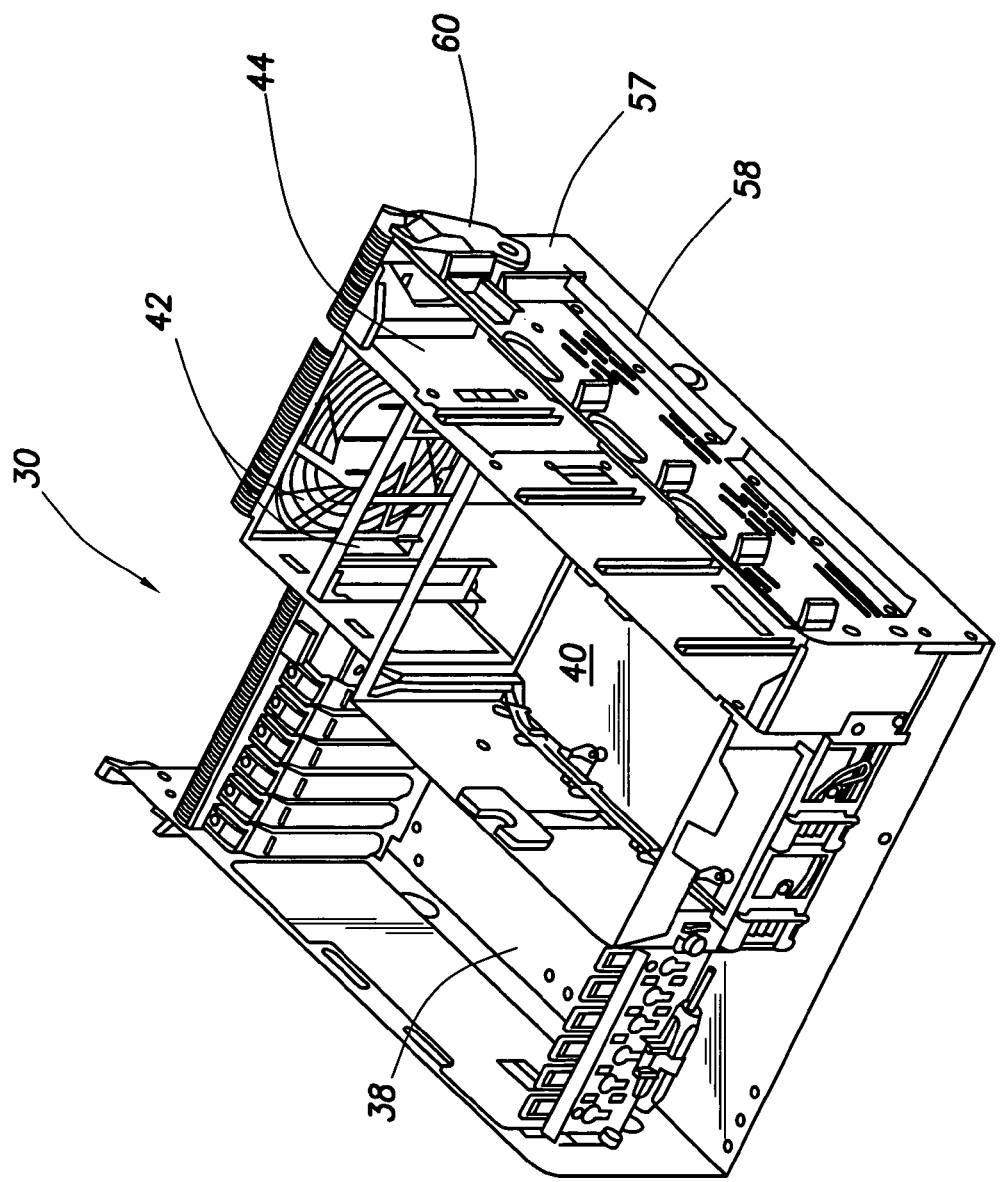
FIG. 3 illustrates a front perspective view of a rear drawer in accordance with embodiments of the invention.

Referring now to FIG. 3, embodiments of a rear drawer 30 are shown comprising expansion card bay 38, processor bay 40, cooling system bay 42, and memory bay 44. Both sides 57 of rear drawer 30 also include rails 58 to located the drawer vertically and latches 60 to lock the drawer onto chassis base 20. Rear drawer 30 is configured to have sufficient positional variation relative to chassis base 20 in order to properly align with and engage front drawer 28.

Figure 4:
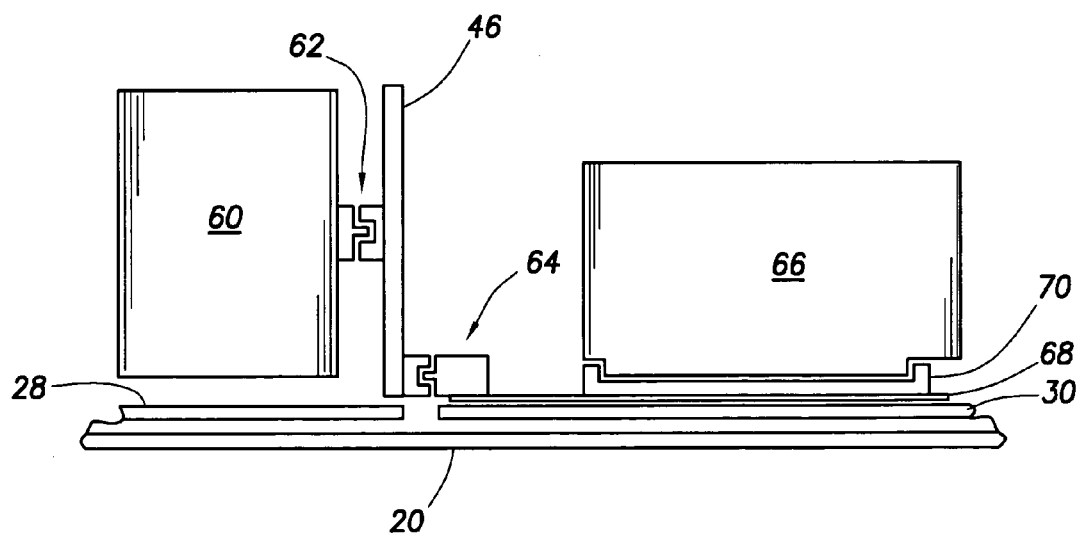
FIG. 4 illustrates a schematic view of the electrical coupling of the components in accordance with embodiments of the invention.

Referring now to FIG. 4, a schematic illustration of the electrical coupling of front drawer 28 and rear drawer 30 is shown. Front drawer 28 supports midplane board 46, which is coupled to modular component 60 by connector 62. Rear drawer 30 supports motherboard 68, which is coupled to modular component 66 by connector 70. Connector 64 couples midplane board 46 to motherboard 68. Midplane board 46 provides the interface between all of the modules and power supplies within chassis 10. Thus, all of the components housed in both the front drawer 28 and rear drawer 30 are coupled by various connectors, which eliminate complex wiring and allow for simple modularized replacement of components.

Assembly of modular components into front drawer 28 may be performed before the drawer is installed in chassis base 20. For example, a power supply module can be installed in bay 32, one or more hard drives can be installed into bay 34, and a disc drive can be installed into media module bay 36. These components are installed by sliding the components into the selected bay and engaging a connector mounted on the rear of the component with a complimentary connector on the front of mid-plane board 46.

Assembly of modular component into rear drawer 30 may also be performed with the drawer not installed in chassis base 20. For example, one of more expansion cards can be installed into expansion card bay 38, multiple processors and heat sinks can be installed in processor bay 40, fans can be installed in cooling system bay 42, and memory modules can be installed in memory bay 44. These components are installed by vertically inserting the components into the appropriate bay and engaging a connector mounted to a motherboard at the base of rear drawer 30.

Referring now to FIG. 5, front drawer 28 is slid into chassis base 20 from front 22 until fully engaged. Rails 50 on front drawer 28 engage rails 72 on chassis base 20, which support the weight of the front drawer and its components. Chassis base 20 may also include a pin 74, which engages a slot (not shown) on the base of front drawer 28 and controls the lateral position of the drawer. Once front drawer 28 is fully engaged, springs 52 and latches 54 engage chassis base 20. Thumbscrews 56 can also be engaged to further secure front drawer 28 to the base.

Once front drawer 28 is secured to chassis base 20, rear drawer 30 can be installed. Rails 58 on rear drawer 30 engage rails 76 on chassis base 20, which support the weight of the rear drawer and its components. As rear drawer 30 is slid toward front drawer 28, the connectors on the mid-plane board and the motherboard engage. Latches 59 can then be used to secure rear drawer 30 to chassis base 20.

Thus, none of the critical components of the system are permanently affixed to chassis base 20. This allows for the modules to be upgraded without changing the chassis design or even removing the chassis base from the storage rack. Therefore, upgrading is greatly simplified and can be performed at lower costs and without redesign or modification of the chassis.

Referring now to FIG. 6, there are illustrated exemplary embodiments of a midplane board 46. Midplane board 46 comprises front connectors 78, 79, and 80 and rear connector 82. Midplane board 46 is mounted to front drawer 28 with mounting screws or other securing methods. Connector 78 is in alignment with power supply bay 32 and engages the module installed in that bay. Connector 80 is in alignment with hard drive bay 32 and engages the modules installed in that bay. Connector 82 is in alignment with media module bay 36 and engages the module installed in that bay. Rear connector 82 is aligned with a complementary connector on rear drawer 30 when the rear drawer is inserted into chassis base 20. This permits the components mounted in rear drawer 30 to be plugged directly into midplane board 46.

Midplane board 46 is used to directly interconnect all of the modules and their associated components and the power supplies with direct connectors and without any ribbon signal and power cables. The direct connectors facilitate easy assembly and disassembly of the modules from chassis 10, and further permit easy hot-swappability of the power supplies. By not utilizing any ribbon signal and power cables to interconnect the modules and power supplies, a small form factor can be maintained for chassis 10, thereby saving valuable rack mounting space of the chassis 10. By also allowing for easy assembly and disassembly of the modules, the amount of down time for the computer is minimized for repair and/or upgrades of the modules.

The above discussion is meant to be illustrative of the principles and various embodiments of the present invention. Numerous variations and modifications will become apparent to those skilled in the art once the above disclosure is fully appreciated. For example, the drawers can support a different number or configuration of modular components or a system may employ more than two drawers. Similarly, the arrangement and configuration of the interface between the drawers and the chassis base can be embodied in may different forms. It is intended that the following claims be interpreted to embrace all such variations and modifications.

What is claimed is:

1. A computer chassis comprising:
   a chassis base;
   a first drawer removably engaged with said chassis base;
   an interface board mounted to said first drawer, wherein said interface board has a first side arranged so as to couple to a first electrical component when the first electrical component is located in the first drawer and the first drawer is not engagped with said chassis base;
   a second drawer removably engaged with said chassis base;
   a motherboard mounted to said second drawer so as to couple to a second electrical component when the second electrical component is located in the second drawer; and
   a connector, coupled to said motherboard, wherein said connector engages a second side of said interface board so as to couple the first electrical component to the second electrical component when the first and second electrical components are located in the respective first and second drawers.

2. The computer chassis of claim 1 wherein said first and second drawers slidably engage said chassis base.

3. The computer chassis of claim 1 further comprising a latch operable to secure said first drawer to said chassis base, wherein said latch is hand-operable.

4. The computer chassis of claim 1 wherein said first drawer further comprises a power supply bay, a hard drive bay, and a media module bay.

5. The computer chassis of claim 1 wherein said second drawer further comprises an expansion card bay, a processor bay, a cooling system bay, and a memory bay.

6. The computer chassis of claim 1 wherein said motherboard is directly interconnected to said connector.

7. The computer chassis of claim 6 wherein the second electrical component is directly connected to said motherboard when the second electrical component is located in the second drawer.

8. The computer chassis of claim 1 wherein the first electrical component is directly connected to said interface board when the first electrical component is located in the first drawer.

9. A computer comprising:
   a first electrical component;
   a first drawer operable to receive said first electronic component;

a midplane board affixed to said first drawer and having a first side coupled to said first electrical component;

a second electrical component;

a second drawer operable to receive said second electrical component;

a motherboard affixed to said second drawer and coupled to said second electrical component;

a connector mounted to said second drawer and coupled to said motherboard; and a chassis base operable to support said first drawer and said second drawer such that said connector is coupled to a second side of said midplane board, wherein said first electrical component can be coupled to said midplane board when said first drawer is not supported by said chassis base.

10. The computer of claim 9 wherein said first electrical component is horizontally received in said first drawer.

11. The computer of claim 10 wherein said midplane board is vertically mounted to said first drawer.

12. The computer of claim 11 wherein said second electrical component is vertically received by said second drawer.

13. The computer of claim 9 wherein said motherboard is horizontally mounted to said second drawer and directly interconnected to said connector.

14. The computer of claim 13 wherein said first electrical component is a power supply module.

15. The computer of claim 14 wherein said second electrical component is a processor module.

16. The computer of claim 15 further comprising a memory module mounted to said second drawer and coupled to said motherboard.

17. The computer of claim 9 wherein said first electrical component is directly connected to said midplane board.

18. The computer of claim 9 wherein said connector is directly connected to said midplane board.

19. An electrical assembly comprising:

means for mounting an interface board to a drawer that is slidably engageable with a chassis;

means for coupling a first electrical component disposed in the drawer to one side of the interface board when the drawer is not engaged with the chassis;

means for coupling a motherboard to the other side of the interface board; and means for coupling a second electrical component to the motherboard.

20. The electrical assembly of claim 19 wherein said first electrical component comprises a power supply module.

21. The electrical assembly of claim 20 wherein said second electrical component comprises a processor module and a memory module.

22. The electrical assembly of claim 19 wherein the interface board is vertically mounted in the chassis.

23. The electrical assembly of claim 22 wherein the means for coupling the electrical components to the interface board slidably engage.

24. A method for constructing a computer comprising:

attaching a midplane board to a first drawer;

mounting a first electrical component in the first drawer so as to be coupled to the midplane board;

mounting a motherboard to a second drawer, wherein the motherboard is coupled to a connector;

mounting a second electrical component to the second drawer such that the second electrical component is coupled to the motherboard;

installing the first drawer into a chassis base after the first electrical component is coupled to the midplane board; and installing the second drawer into the chassis base such that the connector is coupled to the midplane board.

25. The method of claim 24 wherein the midplane board is vertically attached to the first drawer.

26. The method of claim 25 wherein the first electrical component is mounted by sliding horizontally into the first drawer.

27. The method of claim 26 wherein the second electrical component is mounted by sliding vertically into the second drawer.

28. The method of claim 27 wherein the drawers are installed by sliding horizontally into the chassis base.

29. The method of claim 24 wherein the first electrical component and the connector directly connect to the midplane board.

* * * * *

UNITED STATES PATENT AND TRADEMARK OFFICE
CERTIFICATE OF CORRECTION

| | | |
|---|---|---|
| PATENT NO. | : 7,072,186 B2 | Page 1 of 1 |
| APPLICATION NO. | : 10/721806 | |
| DATED | : July 4, 2006 | |
| INVENTOR(S) | : Thomas T. Hardt et al. | |

It is certified that error appears in the above-identified patent and that said Letters Patent is hereby corrected as shown below:

In column 4, line 29, in Claim 1, delete "engagped" and insert -- engaged --, therefor.

In column 4, line 36, in Claim 1, after "connector" delete ",".

Signed and Sealed this

Twenty-eighth Day of July, 2009

JOHN DOLL
*Acting Director of the United States Patent and Trademark Office*